(12) United States Patent
Mabe et al.

(10) Patent No.: US 10,934,021 B2
(45) Date of Patent: Mar. 2, 2021

(54) SHAPE MEMORY ALLOY SPACER SYSTEM

(71) Applicant: The Boeing Company, Chicago, IL (US)

(72) Inventors: James Henry Mabe, College Station, TX (US); Frederick Theodore Calkins, Renton, WA (US); Stephen K. Kirchmeier, Bothell, WA (US); Edward Andrew Whalen, Webster Groves, MO (US); Donald William Ruhmann, Seattle, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 16/174,472

(22) Filed: Oct. 30, 2018

(65) Prior Publication Data

US 2020/0130865 A1    Apr. 30, 2020

(51) Int. Cl.
*B64F 5/10*    (2017.01)

(52) U.S. Cl.
CPC ..................... *B64F 5/10* (2017.01)

(58) Field of Classification Search
CPC ............. B64C 1/12; Y10T 29/49826; Y10T 29/49908; Y10T 29/49616; Y10T 29/49622; Y10T 29/49629
See application file for complete search history.

(56) References Cited

U.S. PATENT DOCUMENTS

| | | | | |
|---|---|---|---|---|
| 6,773,535 B1* | 8/2004 | Wetzel | ................... | B29C 65/76 156/247 |
| 6,865,791 B2* | 3/2005 | Cook | .................. | E04G 23/0218 29/447 |
| 7,288,326 B2* | 10/2007 | Elzey | ..................... | C22F 1/006 428/179 |
| 8,434,293 B2* | 5/2013 | Widdle, Jr. | ............... | F02K 1/10 60/264 |
| 10,300,313 B2* | 5/2019 | Baz | ....................... | A62B 17/003 |
| 2009/0159749 A1* | 6/2009 | Etzkorn | .................... | B64C 1/12 244/131 |
| 2016/0023406 A1* | 1/2016 | Shome | .................... | B32B 37/18 156/221 |

FOREIGN PATENT DOCUMENTS

WO    WO2001086096 A1    11/2001

* cited by examiner

*Primary Examiner* — Jason L Vaughan
*Assistant Examiner* — Amanda Kreiling
(74) *Attorney, Agent, or Firm* — Yee & Associates, P.C.

(57) ABSTRACT

A method for aligning and joining a first structure to a second structure in an aircraft is provided. A spacer system having a shape memory alloy is positioned in a gap between the first structure and the second structure. The shape memory alloy is initially in a cooled state. A temperature of the shape memory alloy is increased such that the shape memory alloy changes from the cooled shape to a heated shape to fill the gap and apply a load to hold the first structure in place relative to the second structure. Additional processes may then be performed to join the first structure to the second structure.

20 Claims, 12 Drawing Sheets

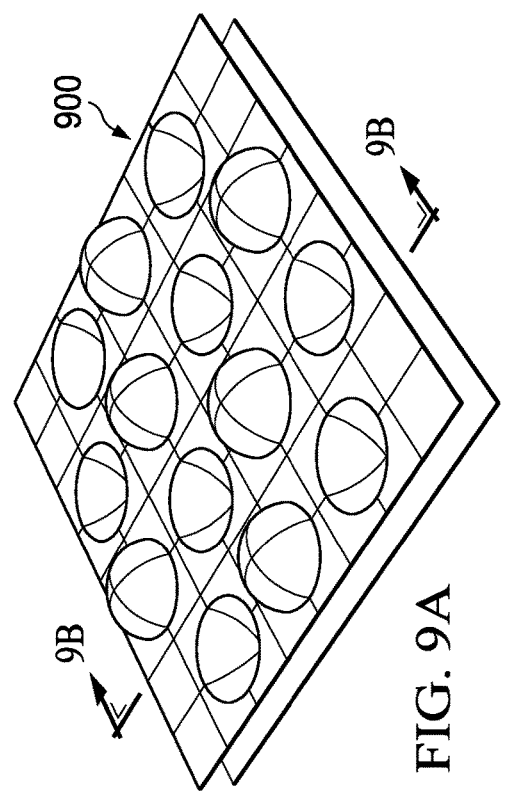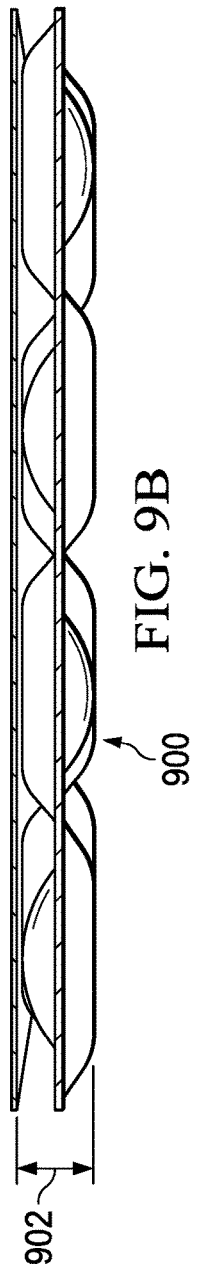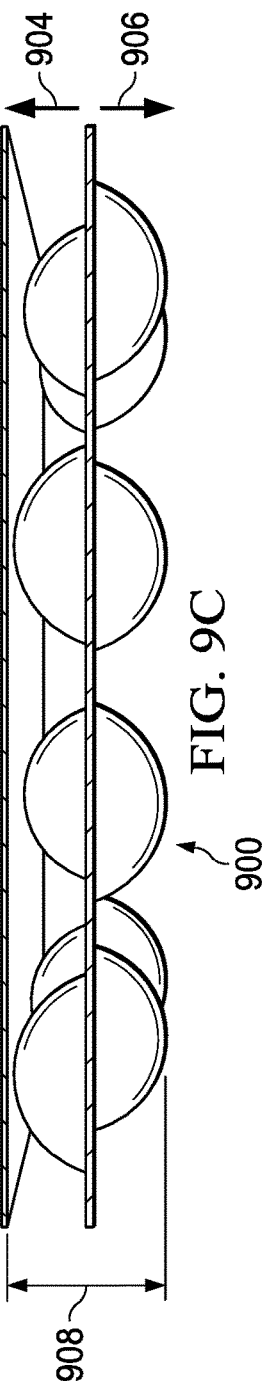

SHAPE MEMORY ALLOY SPACER SYSTEM

BACKGROUND INFORMATION

1. Field

The present disclosure relates generally to manufacturing and assembling structures. More specifically, the present disclosure relates to a shape memory alloy spacer system for aligning and holding parts in place during assembly of a larger structure.

2. Background

Manufacturing and assembling large platforms, such as aircraft, is time-consuming and complex process. Hundreds or even thousands of parts are needed to complete the aircraft. Many of these parts must be joined using fasteners or other means.

Even small variations in dimensions of manufactured parts may lead to gaps between parts or poor alignment of one part relative to the other. For example, fasteners may be used to join an aircraft skin panel to a spar. If an unfilled gap is present between the skin and the spar, tightening of the fasteners may deform one or both parts in an undesired manner. Such deformation may impact the aerodynamic shape of the skin, deform structural parts past yield, or leave a space where debris may accumulate.

To address this problem, manufacturers place a shim in the gap between parts. The shim is used to reduce distortion of the parts as the fasteners are installed. These shims may be custom fabricated in a range of sizes and materials. Custom fabrication of shims for various applications may be more time-consuming and expensive than desired. Shims are not versatile. For instance, one type of custom shim may work well when placed between one set of parts but not another set of parts. Further, selection of the appropriate shim and installation of that shim requires manual labor, thus increasing the time and cost to assemble an aircraft.

Therefore, it would be desirable to have a method and apparatus that takes into account at least some of the issues discussed above, as well as other possible issues.

SUMMARY

An illustrative embodiment of the present disclosure provides a method for joining a first structure to a second structure. A spacer system is positioned in a gap between the first structure and the second structure. The spacer system comprises a shape memory alloy in a cooled shape. A temperature of the shape memory alloy is increased such that the shape memory alloy changes from the cooled shape to a heated shape to fill the gap and apply a load to the first structure and the second structure. The spacer system holds the first structure in place relative to the second structure.

Another illustrative embodiment of the present disclosure provides a spacer system comprising a shape memory alloy. The shape memory alloy is configured to form a desired expanded shape when heated such that the spacer system fills a gap between a first structure and a second structure and applies a load to hold the first structure in place relative to the second structure.

A further illustrative embodiment of the present disclosure provides a method for assembling an aircraft. A spacer system having a shape memory alloy is positioned in a gap between a first structure and a second structure in the aircraft. The shape memory alloy is in a cooled shape when placed in the gap. A temperature of the shape memory alloy is increased such that the shape memory alloy changes from the cooled shape to a heated shape to fill the gap and apply a load to hold the first structure in place relative to the second structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 9A-9C are illustrations of alternative implementations for a spacer system in accordance with an illustrative embodiment;

DETAILED DESCRIPTION

The illustrative embodiments recognize and take into account one or more different considerations. For example, the illustrative embodiments recognize and take into account that joining two aircraft structures is a labor-intensive process. In some cases, two parts do not align properly at a joint, resulting in gaps between the parts. During assembly, fasteners are used to join these parts together. If space exists between the parts, the drilling, installing, or tightening those fasteners may deform one or both parts. The illustrative embodiments recognize and take into account that current processes implement custom shims to solve the deformation problem. Holes are drilled through both parts and the shim, the shim is removed, debris cleaned, and the shim reinserted. Installation and removal of the proper shim is done using manual labor or assembly line processes. Since an aircraft has hundreds of joints that may need shimming, potentially thousands of man hours are needed.

The illustrative embodiments also recognize and take into account that shim fabrication and selection for each application may take more time than desired. In order to prevent deformation of parts, the shim needs to be tight enough to fill the gap during drilling and fastener installation, but not so tight that it cannot be pulled to allow for cleaning debris after drilling. Selection of the proper shim is also done using manual labor, costing the manufacturer many more labor hours.

Further, the illustrative embodiments recognize and take into count that custom shims are expensive to machine and are designed for use in only one size of gap. Consequently, custom shims are not versatile, and laborers must have many options available to choose from. Selection of shims for use in joining aircraft structures is a trial and error process, therefore reducing efficiency and increasing cost to assemble an aircraft.

Thus, the disclosed embodiments provide a method for joining a first structure to a second structure. A spacer system having a shape memory alloy is positioned in a gap between the first structure and the second structure. During positioning, the shape memory alloy is in its cooled shape. The temperature of the shape memory alloy is increased such that the shape memory alloy changes from the cooled shape to a heated shape to fill the gap and apply a load to hold the first structure in place relative to the second structure.

Figure 1:
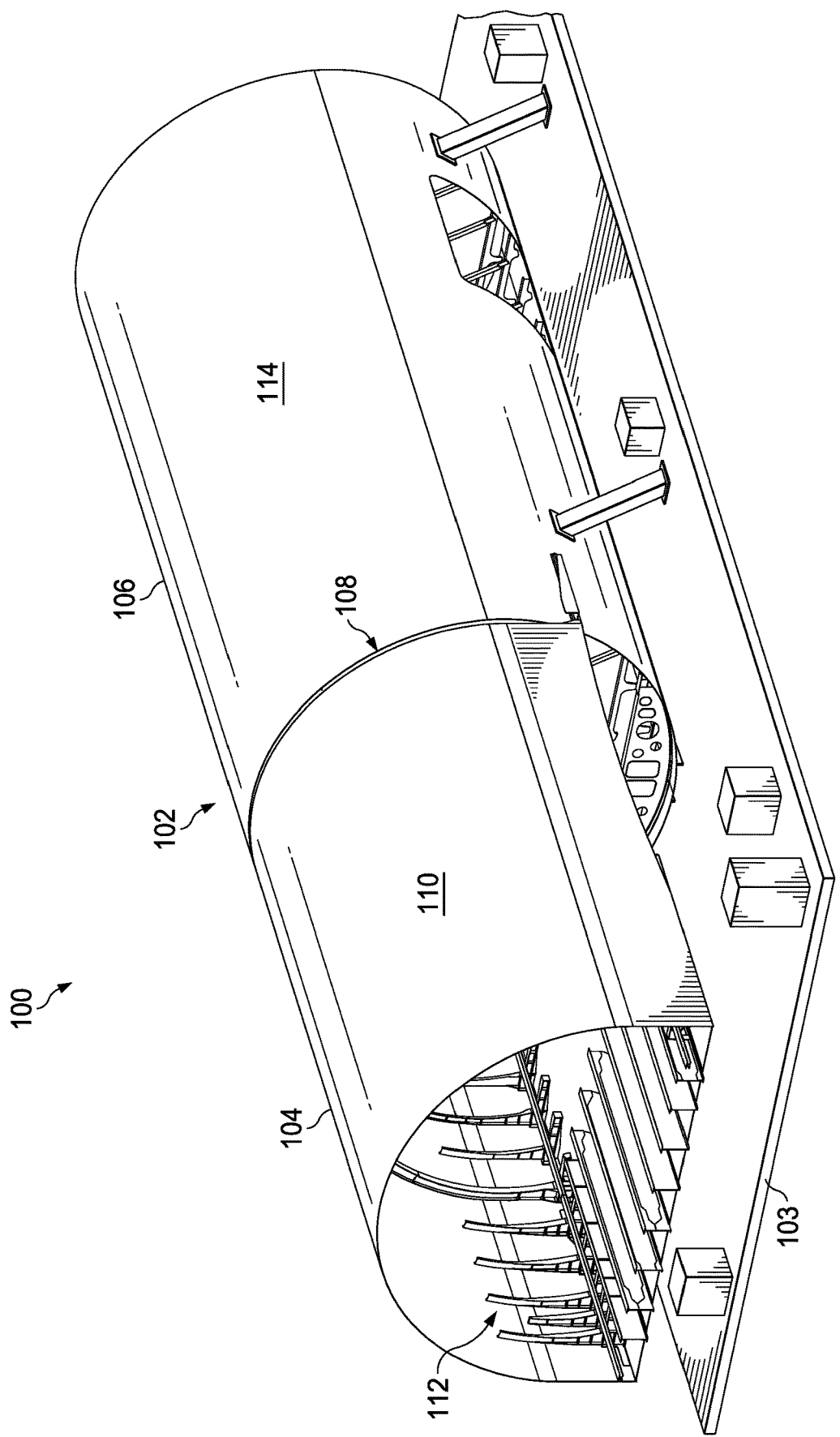
FIG. 1 is an illustration of a manufacturing environment in accordance with an illustrative embodiment.

With reference now to the figures and, in particular, with reference to FIG. 1, an illustration of a manufacturing environment with an aircraft assembly is depicted in accordance with an illustrative embodiment.

Manufacturing environment 100 includes aircraft assembly 102. Aircraft assembly 102 is supported by platform 103. Platform 103 may be used to hold one or more parts in aircraft assembly 102 in place while manufacturing processes are being performed.

Aircraft assembly 102 may contain a number of parts used to form an aircraft. In this illustrative example, aircraft assembly 102 comprises body section 104 and body section 106. Body section 104 and body section 106 are joined to one another at joint 108.

In this illustrative example, body section 104 may be a mid-body section oriented over the wing of the aircraft (not shown in this view). Body section 106 may be an aft body section. Body section 104 has skin 110 and stabilizers 112. Body section 106 has skin 114 and stabilizers (not shown in this view). Skin 110 of body section 104 may be joined to one or more stabilizers 112 at joint 108 as well.

Figure 2:
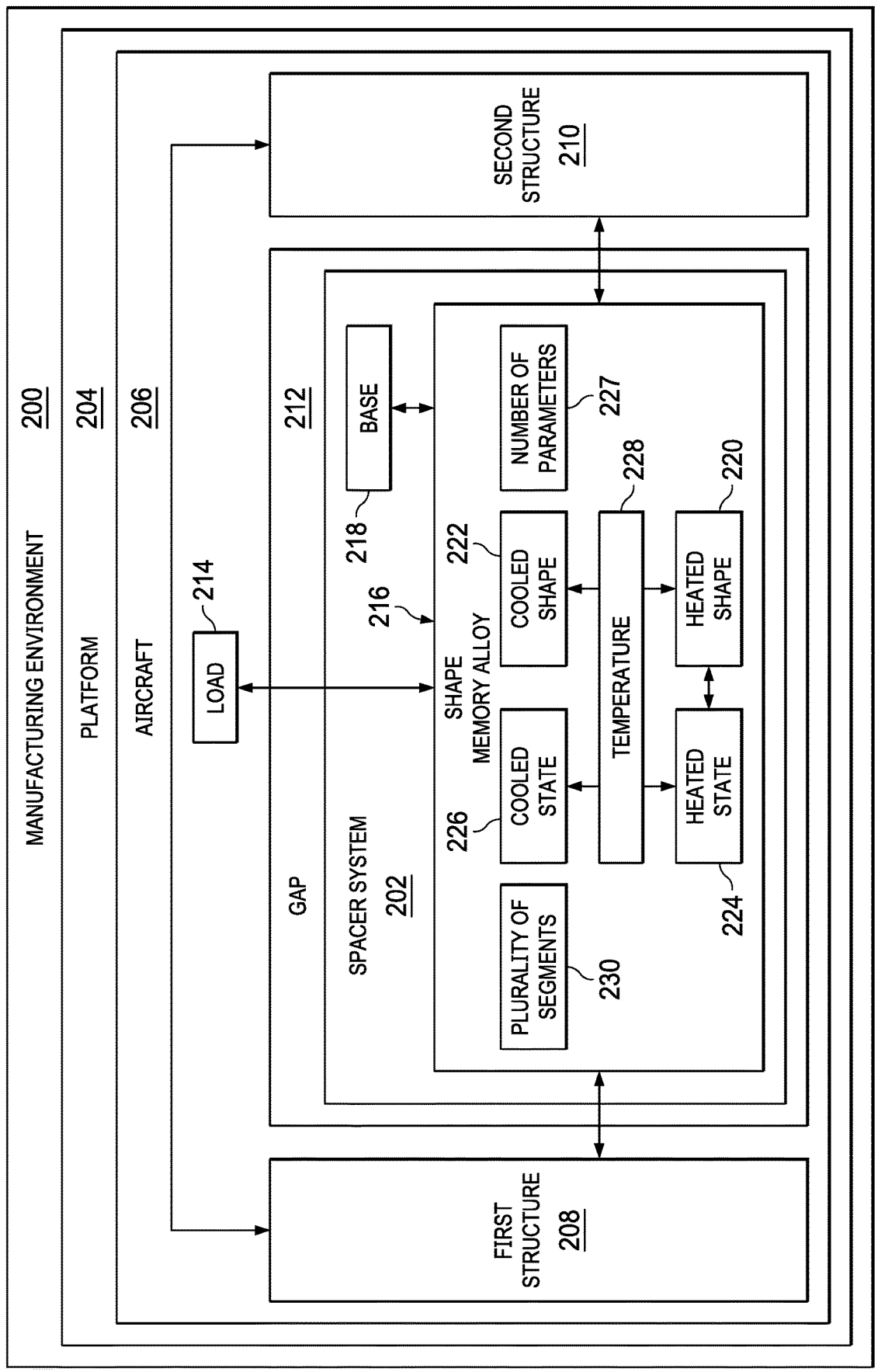
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where spacer system 202 may be used while assembling platform 204. Specifically, components within spacer system 202 may be used to stabilize and align parts in platform 204 as those parts are joined together.

In this illustrative example, platform 204 may be, for example, without limitation, a mobile platform, a stationary platform, a land-based structure, an aquatic-based structure, or a space-based structure. More specifically, platform 204 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 204 takes the form of aircraft 206 in this illustrative example. Aircraft 206 is in the process of being assembled in manufacturing environment 200. Aircraft 206 comprises first structure 208 and second structure 210. First structure 208 and second structure 210 may take many different forms. For example, without limitation, first structure 208 may be a skin panel and second structure 210 may be a stabilizer in this illustrative example. In other illustrative examples, first structure 208 and/or second structure 210 may take the form of an engine housing, a rib, a spar, a flap, a vertical stabilizer, a horizontal stabilizer, a panel, a seat, or some other suitable aircraft structure. It is desirable to join first structure 208 to second structure 210 to assemble aircraft 206.

As depicted, gap 212 may exist between first structure 208 and second structure 210 when first structure 208 and second structure 210 are aligned with one another. Gap 212 may be caused by variability in the dimensions of manufactured parts, part defects, or in some other manner.

Spacer system 202 is configured for use in gap 212 between first structure 208 and second structure 210. Specifically, spacer system 202 is positioned within gap 212 and activated such that spacer system 202 applies load 214 to first structure 208 and second structure 210 to hold those structures in a desired position while joined. In other words, spacer system 202 acts as a shim.

As illustrated, spacer system 202 comprises shape memory alloy 216 and base 218. Shape memory alloy 216 has heated shape 220 and cooled shape 222. During manufacturing of shape memory alloy 216, a desired heated shape 220 is determined. Shape memory alloy 216 is preformed into that shape. Heated shape 220 may also be known as the set shape or expanded shape for shape memory alloy 216. Then, shape memory alloy 216 is cooled to form cooled shape 222. Cooled shape may also be known as the contracted shape for shape memory alloy 216. Shape memory alloy 216 may then be deformed to fit within gap 212 between first structure 208 and second structure 210.

Shape memory alloy 216 may be deformed using a number of different processes such as, for example, without limitation, pressing shape memory alloy 216, stretching shape memory alloy 216, or the like. In some illustrative examples, deformation may be achieved by applying pressure to shape memory alloy 216 until cooled shape memory alloy 216 is substantially flat. In other illustrative examples, shape memory alloy 216 may not be substantially flat after deformation processes.

Shape memory alloy 216 is configured to remember heated shape 220 and expanded to heated shape 220 as heat is applied to shape memory alloy 216. Specifically, shape memory alloy 216 is configured to form a desired heated shape 220 when heated such that the spacer system 202 fills gap 212 between first structure 208 and second structure 210 and applies load 214 to hold first structure 208 in place relative to second structure 210.

Once spacer system 202 is in place, additional processes may be performed on the assembly. In this manner, first structure 208 may be joined to second structure 210 without the risk of undesired deformation in one or more of the parts.

Heated shape 220 for spacer system 202 is determined using number of parameters 227 selected from at least one of a sheet thickness, two-dimensional geometric feature shape, three-dimensional geometric feature shape, geometric feature height, geometric feature spacing, a material, and other suitable parameters. As used herein, "a number of" when used with reference to items means one or more items. Thus, number of parameters 227 is one or more parameters. For example, without limitation, two-dimensional or three-dimensional features may include arches, domes, ridges, or other geometric features.

Shape memory alloy 216 may comprise a material selected from at least one of nickel-titanium alloy, copper-aluminum-nickel alloy, copper-nickel-niobium, nickel-titanium-hafnium, nickel-titanium-zirconium, or other suitable shape memory alloy materials.

Number of parameters 227 for heated shape 220 of shape memory alloy 216 control the displacement and forces applied by shape memory alloy 216 on first structure 208 and second structure 210. Shape memory alloy 216 also may be configured to expand in one direction or both directions.

The geometric feature spacing for heated shape 220 of shape memory alloy 216 may be uniform, may be configured to have extended areas for fastener holes, or may have complex shapes. For example, without limitation, ridges for heated shape 220 of shape memory alloy 216 may be triangle-shaped, sine wave-shaped, a structured truss, varying height, or other suitable shapes, depending on the particular implementation and parameters of gap 212.

Heated shape 220 and cooled shape 222 for shape memory alloy 216 correspond to heated state 224 and cooled state 226, respectively. Heated state 224 may be known as the austenite state for shape memory alloy 216, while cooled state 226 may be known as the martensite state for shape memory alloy 216.

In this illustrative example, temperature 228 determines whether shape memory alloy 216 is in heated shape 220 or cooled shape 222. In other words, when shape memory alloy 216 is heated to reach heated state 224, it expands. Conversely, when shape memory alloy 216 is cooled to reach cooled state 226, it contracts.

The behavior of shape memory alloy 216 at different levels of temperature 228 may vary. As an example, shape memory alloy 216 may be designed such that cooled state 226, and therefore cooled shape 222, occurs at room temperature. In this case, shape memory alloy 216 must be heated to a selected temperature to reach heated shape 220 in heated state 224.

In another example, shape memory alloy 216 may be designed such that cooled state 226 is at some temperature that is below room temperature. For instance, spacer system 202 may be kept in a cooler or other cooling device until ready for use. In this case, heated state 224 may be reached as shape memory alloy 216 warms and expands at a lower temperature than room temperature, without the need of a heating system. The shape memory alloy may be designed such that it remains in the heated shape throughout the manufacturing and service life of the assembly.

When heat is needed, shape memory alloy 216 may be heated in a number of different ways. For instance, shape memory alloy 216 may be heated using a space heater, applying a hot air source, using a convection heater, or in some other suitable manner. In some illustrative examples, shape memory alloy 216 may be heated using adhesives with an exothermal reaction during curing. The cure would heat shape memory alloy 216 into heated shape 220 while bonding spacer system 202 in place.

As illustrated, shape memory alloy 216 may be a one-way shape memory alloy or a two-way shape memory alloy. When shape memory alloy 216 is a one-way shape memory alloy, shape memory alloy 216 is configured to remain in heated shape 220 and apply load 214 to first structure 208 and second structure 210 when returned to cooled state 226. Spacer system 202 will maintain heated shape 220, preventing deformation of parts during drilling and fastener installation. Such properties may be desirable when spacer system 202 is configured to remain in aircraft 206 and be fastened to first structure 208, second structure 210, or both, for the life of aircraft 206.

When shape memory alloy 216 is a two-way shape memory alloy, shape memory alloy 216 is configured to return to cooled shape 222 when in cooled state 226. Such properties may be desirable when spacer system 202 is configured to be removed from aircraft 206 after fastening of first structure 208 and second structure 210. In some cases, shape memory alloy 216 may not fully return to cooled shape 222 upon cooling, but may contract enough to be removed from gap 212.

As depicted, base 218 is a device configured to support shape memory alloy 216. In some illustrative examples, base 218 may comprise a spring configured to retract spacer system 202 as shape memory alloy 216 returns to cooled state 226. In other illustrative examples, base 218 may have some other configuration or may be absent.

In some illustrative examples, spacer system 202 may be comprised of plurality of segments 230 of shape memory alloy 216. In this case, shape memory alloy 216 is not a single sheet. Rather, spacer system 202 may have more than one segment configured to expand into the same or different shapes in heated state 220. When spacer system 202 has plurality of segments 230 of shape memory alloy 216, base 218 may connect each segment or a separate base may be used for each segment.

With an illustrative embodiment, manufacturing aircraft 206 may take less time and result in less rework than with currently used processes. Spacer system 202 provides a versatile shimming unit for use in various applications. A single design having shape memory alloy 216 is configured for use in multiple sizes and shapes of gap 212, thereby reducing the number of customized shims needed during assembly. A single configuration for spacer system 202 with shape memory alloy 216 can expand to a range of heights. Additionally, spacer system 202 may not need to be removed and re-inserted, thus eliminating a processing step.

Further, applied forces can be controlled by selecting appropriate parameters for heated shape 220 of shape memory alloy 216. Expansion of shape memory alloy 216 is self-limiting as a function of the specific alloy and design such that gap 212 is filled and load 214 is applied without excessive or undesired forces applied to either first structure 208 or second structure 210. The shape and heating for shape memory alloy 216 can be tailored to improve loading support in crucial locations to better maintain part dimensions during and after fastener installation.

The use of an illustrative embodiment substantially reduces deformation of the parts during the joining process. Spacer system 202 helps maintain the aerodynamic shape of the skin, prevent deformation of structural parts past yield, and reduce gaps for debris to accumulate. As a result, less rework is required. Assembling aircraft 206 using spacer system 202 reduces labor hours, reduces cost, and promote efficiency in manufacturing aircraft 206.

Figure 3:
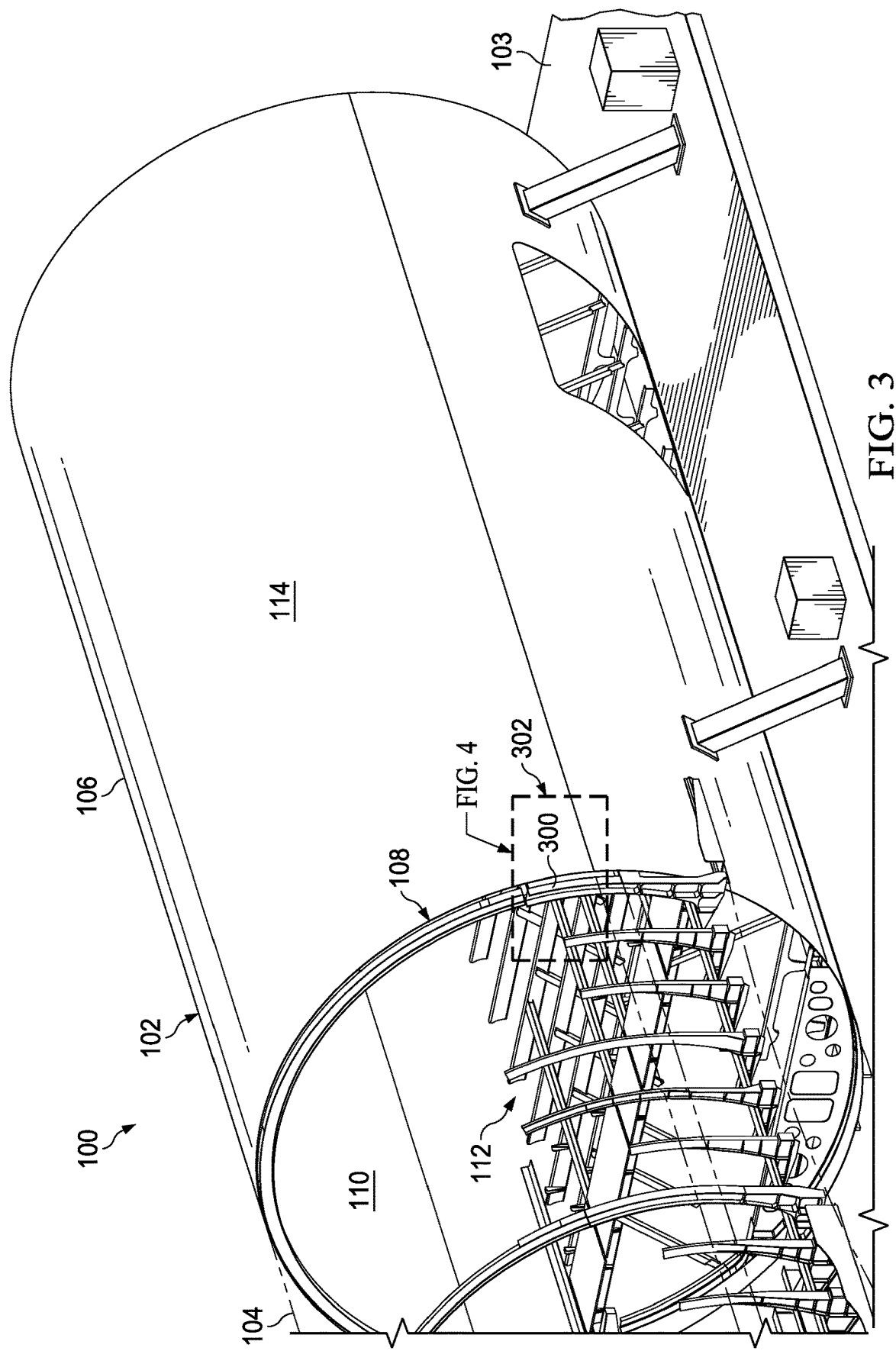
FIG. 3 is an illustration of a perspective view of an aircraft assembly in accordance with an illustrative embodiment.

With reference next to FIG. 3, an illustration of a perspective view of an aircraft assembly is depicted in accordance with an illustrative embodiment. A perspective view of aircraft assembly 102 from FIG. 1 is shown. FIG. 3 illustrates an example of physical implementations of components within manufacturing environment 200 as shown in block form in FIG. 2.

Skin 110 of body section 104 is transparent in this view such that stabilizer 300 at joint 108 is exposed. Skin 110 will be joined to stabilizer 300 in this illustrative example. A more-detailed view of section 302 of aircraft assembly 102 is shown in FIG. 4.

Figure 4:
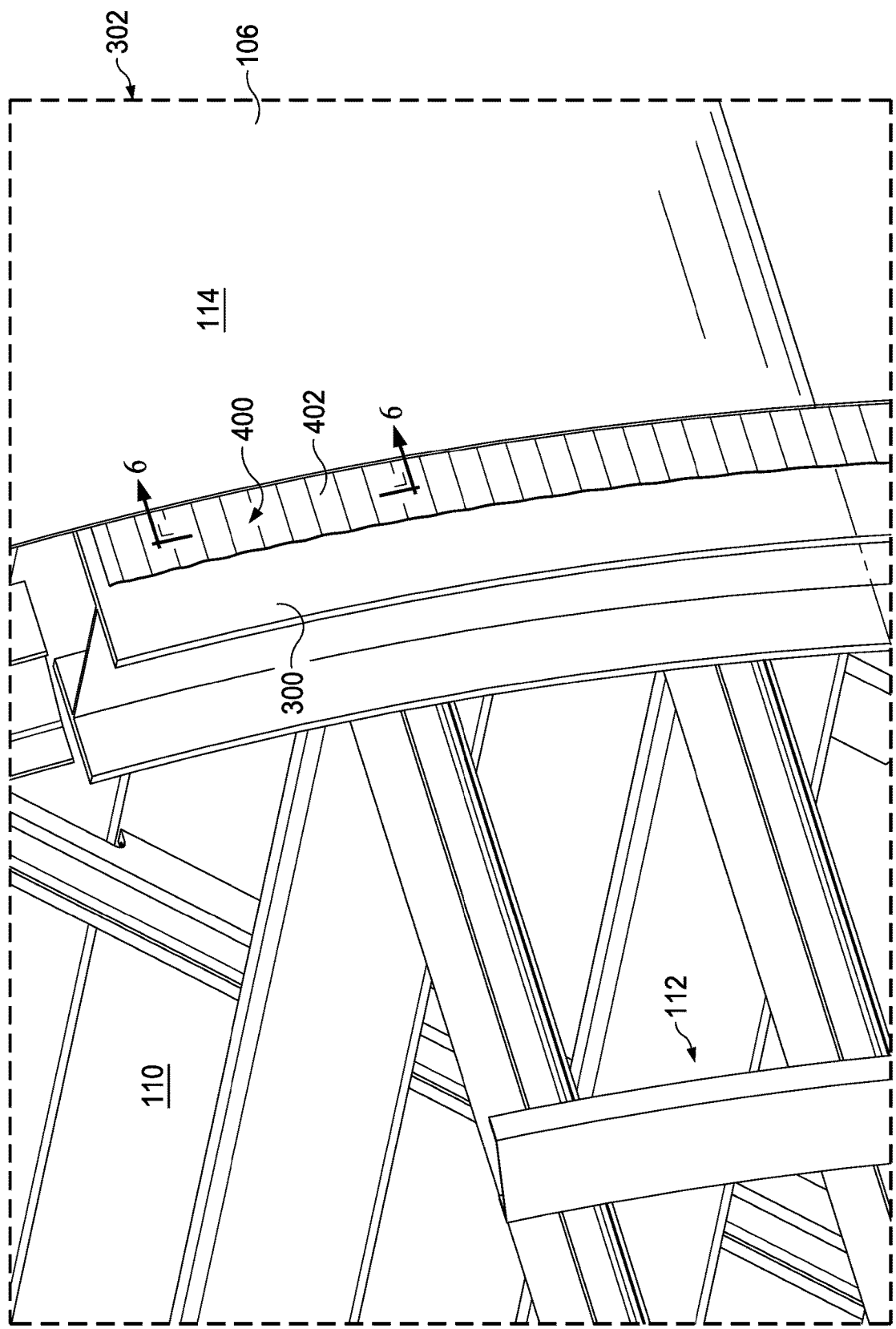
FIG. 4 is an illustration of a perspective view of a section of an aircraft assembly in accordance with an illustrative embodiment.
Figure 5:
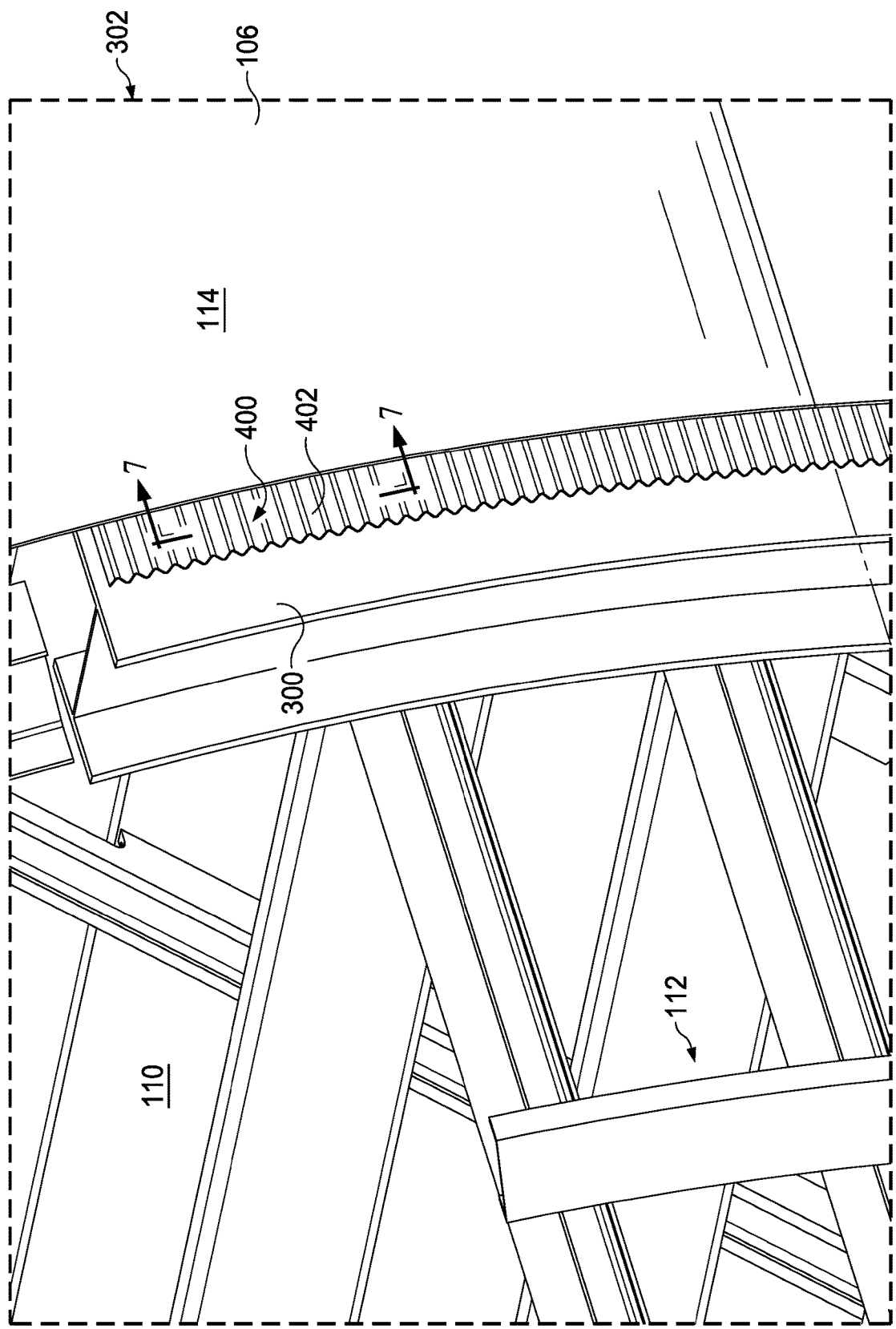
FIG. 5 is another illustration of a perspective view of a section of an aircraft assembly in accordance with an illustrative embodiment.

FIG. 4 and FIG. 5 show illustrations of a perspective view of a section of an aircraft assembly in accordance with an illustrative embodiment. In FIG. 4, spacer system 400 has been positioned in the gap between skin 110 and stabilizer 300. Spacer system 400 comprises shape memory alloy 402. Shape memory alloy 402 in its cooled state in this illustrative example.

In FIG. 5, shape memory alloy 402 has been activated to achieve its expanded state to fill the gap between skin 110 and stabilizer 300. Although a long shim is shown for spacer system 202, many smaller segments could be used in this section as well.

Figure 6:
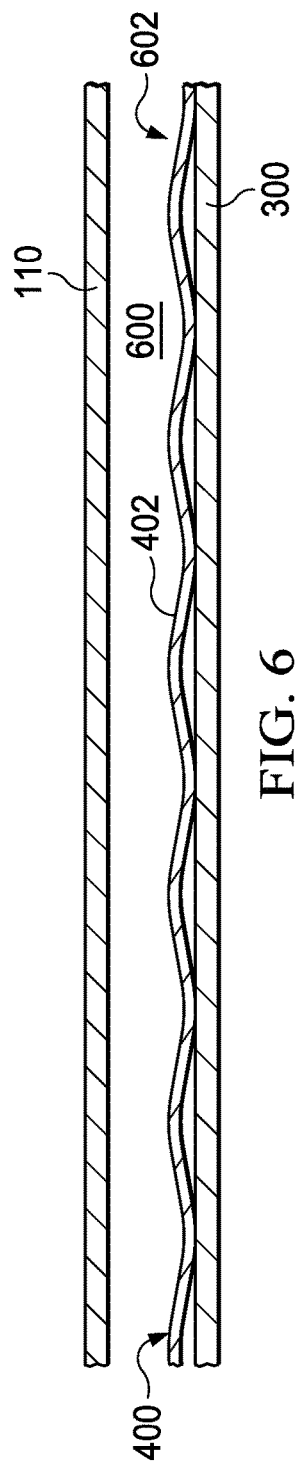
FIG. 6 is an illustration of a cross-sectional view of an aircraft assembly with a spacer system in accordance with an illustrative embodiment.
Figure 7:
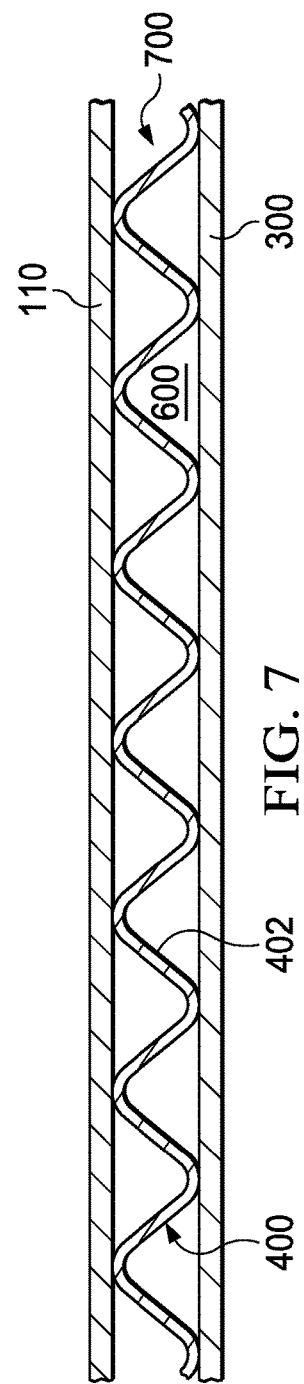
FIG. 7 is another illustration of a cross-sectional view of an aircraft assembly with a spacer system in accordance with an illustrative embodiment.
Figure 8:
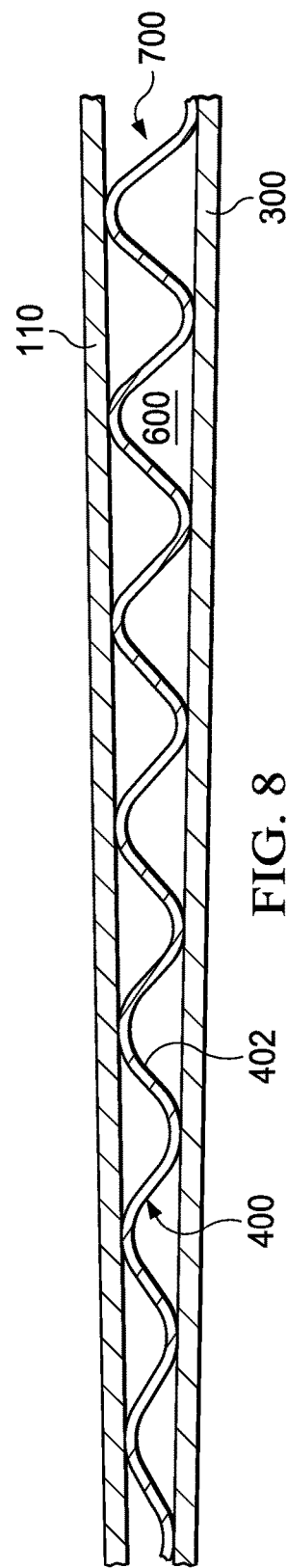
FIG. 8 is yet another illustration of a cross-sectional view of an aircraft assembly with a spacer system in accordance with an illustrative embodiment.

Turning next to FIGS. 6-8, illustrations of cross-sectional views of an aircraft assembly with a spacer system are depicted in accordance with an illustrative embodiment. In FIG. 6, a cross-sectional view of joint 108 between skin 110 of body section 104 and stabilizer 300 is shown along lines 6-6 in FIG. 4.

As illustrated, spacer system 400 with shape memory alloy 402 is positioned in gap 600 between skin 110 and stabilizer 300. Spacer system 400 is in cooled shape 602 in this illustrative example.

FIG. 7 shows a cross-sectional view of joint 108 between skin 110 of body section 104 and stabilizer 300 is shown along lines 7-7 in FIG. 5. Shape memory alloy 402 has been heated and activated. In its heated state, spacer system 400 has heated shape 700. Spacer system 400 applies a desired level of force to skin 110, stabilizer 300, or both to hold the parts in place during fastening.

In FIG. 6 and FIG. 7, gap 600 between skin 110 and stabilizer 300 is uniform. If, however, gap 600 is not uniform, spacer system 400, also shown in FIG. 6 and FIG. 7, with shape memory alloy 402 behaves as shown in FIG. 8. Spacer system 400 is designed to fill gap 600, whether uniform or otherwise.

With reference next to FIG. 9, illustrations of an alternative implementation for a spacer system are depicted in accordance with an illustrative embodiment. FIG. 9A shows a top perspective view of spacer system 900 in an expanded shape.

In FIG. 9B, a cross-sectional view of spacer system 900 is shown in the cooled state. As illustrated, spacer system 900 has thickness 902. Thickness 902 corresponds to spacer system 900 after the shape memory alloy has been flattened prior to installation.

In FIG. 9C, a cross-sectional view of spacer system 900 is shown in the heated state. As depicted, the shape memory alloy in spacer system 900 expanded in both the direction of arrow 904 and the direction of arrow 906 to have an expanded thickness 908.

Next, in FIG. 10, illustrations of ridge shape designs for a spacer system are depicted in accordance with an illustrative embodiment. The embodiments depicted in FIGS. 10A-10D serve merely as examples and are not meant to limit the various configurations or applications for spacer systems in accordance with an illustrative embodiment. Each spacer system is depicted in its expanded state.

Figure 10A:
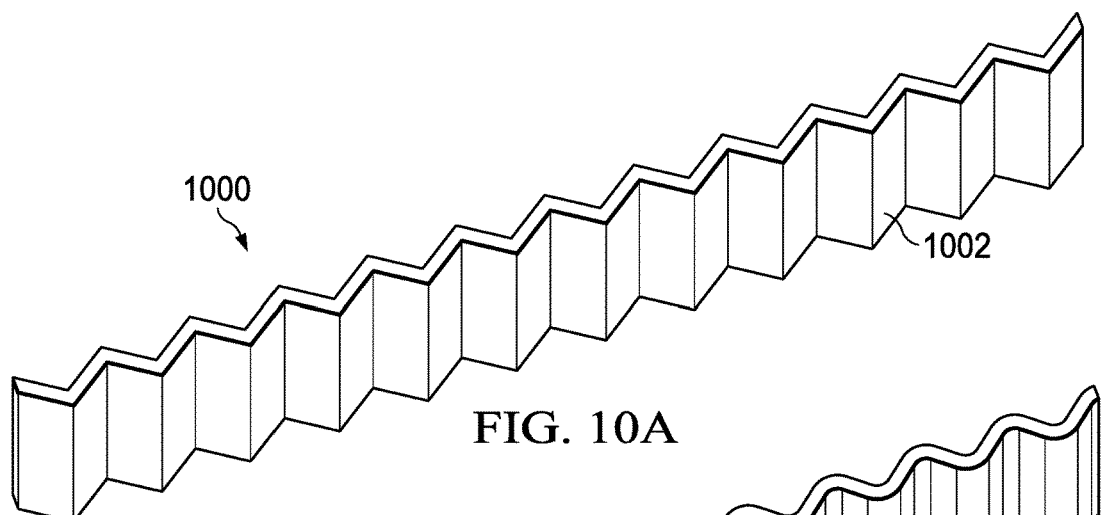
FIGS. 10A-10D are illustrations of ridge shape designs for a spacer system in accordance with an illustrative embodiment.

FIG. 10A depicts spacer system 1000 with ridge shape 1002. Ridge shape 1002 is triangular in this illustrative example.

Figure 10B:
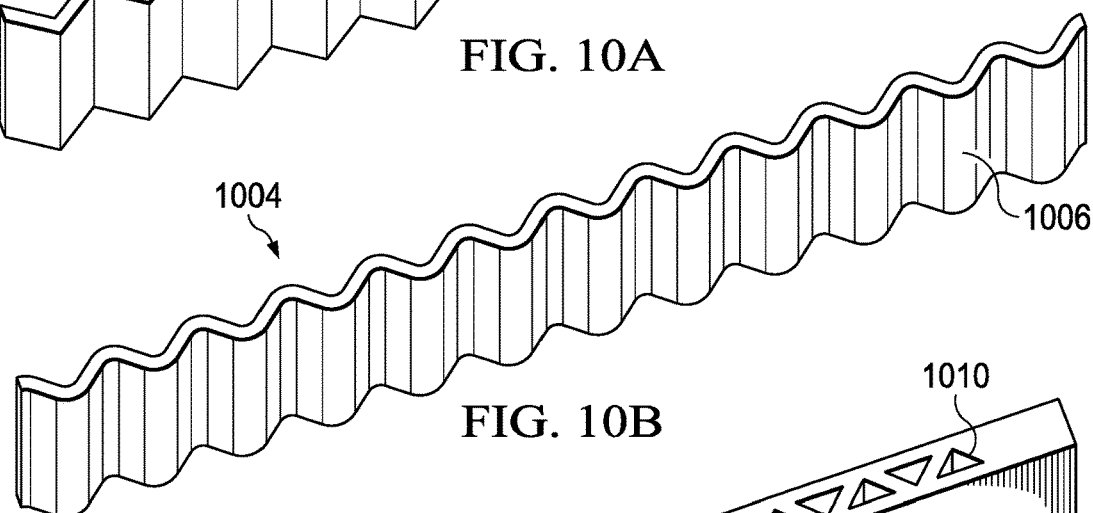

FIG. 10B shows spacer system 1004 having ridge shape 1006. Ridge shape 1006 is a sine-wave in this illustrative example.

Figure 10C:
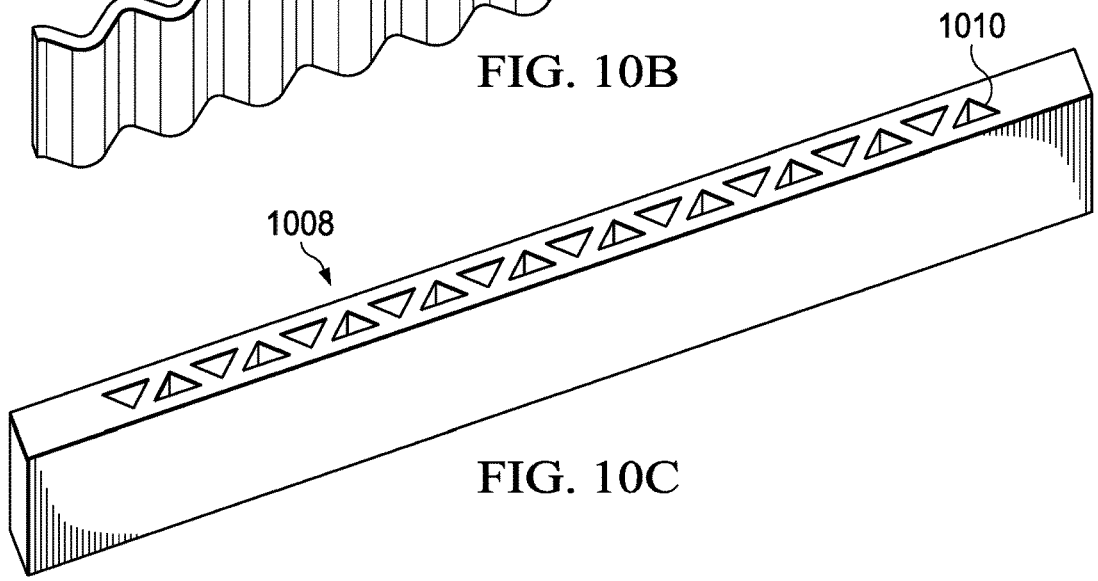

FIG. 10C shows spacer system 1008 with shape 1010. Shape 1010 is a structured truss.

Figure 10D:
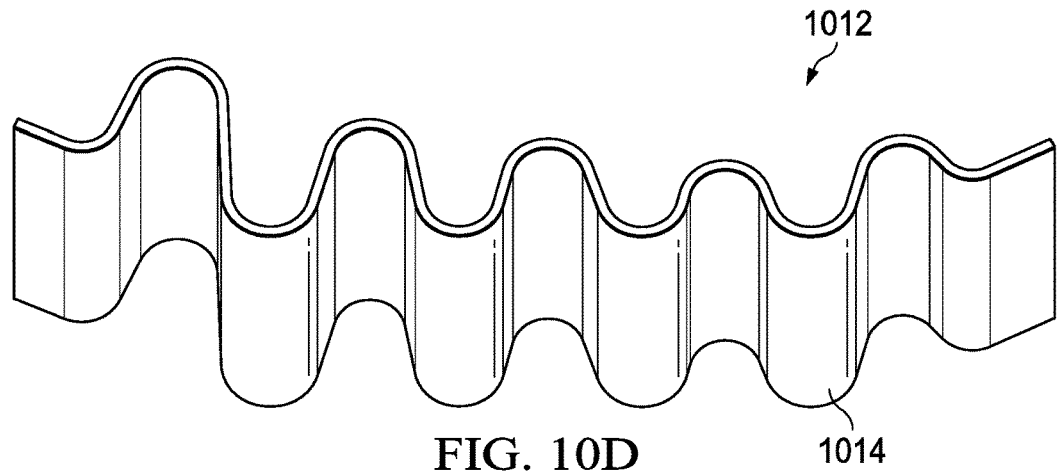

FIG. 10D shows spacer system 1012 with shape 1014. Shape 1014 is a modified sine-wave shape with a varying height.

Figure 11A:
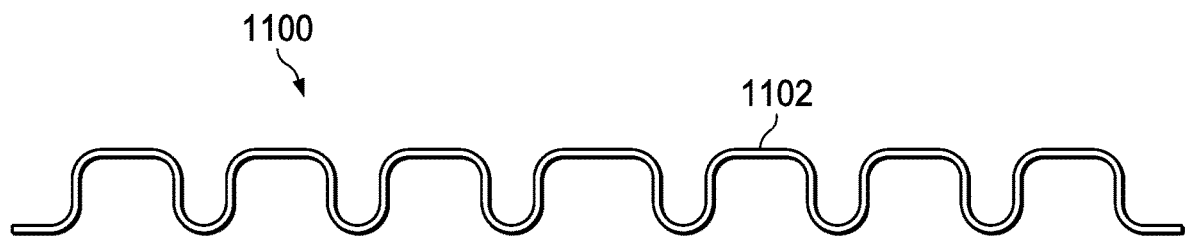
FIGS. 11A-11C are illustration of ridge spacing designs for a spacer system in accordance with an illustrative embodiment.
Figure 11B:
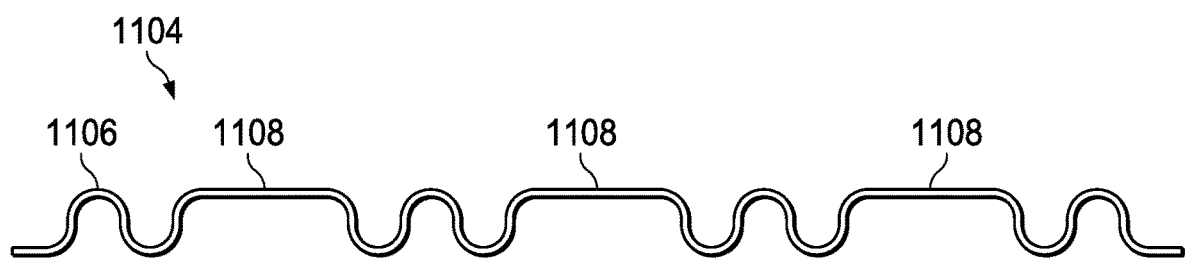
Figure 11C:
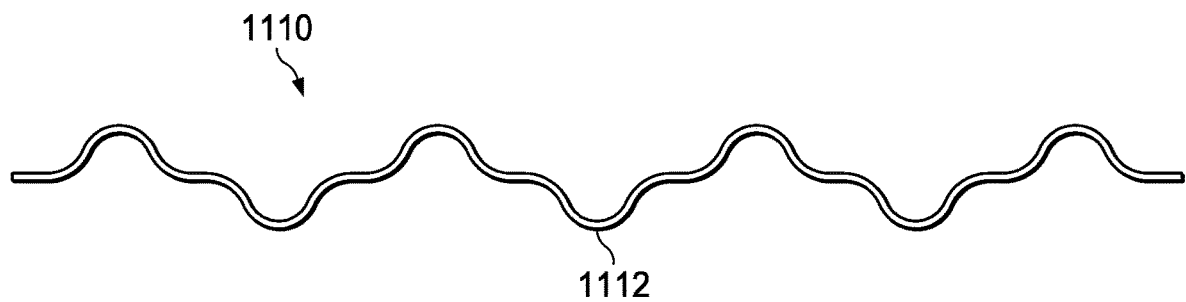

Turning now to FIG. 11, illustrations of ridge spacing designs for a spacer system are depicted in accordance with an illustrative embodiment. The embodiments depicted in FIGS. 11A-11C serve merely as examples and are not meant to limit the various configurations or applications for spacer systems in accordance with an illustrative embodiment. Each spacer system is depicted in its expanded state.

FIG. 11A shows spacer system 1100 with having ridges 1102 with uniform spacing down the entire length of spacer system 1100. FIG. 11B shows spacer system 1104 with ridges 1106 and fastener pads 1108. Fastener pads 1108 are extended areas for fastener holes.

FIG. 11C depicts spacer system 1110 with ridges 1112. Ridges 1112 have a complex shape configured to control displacement and forces in a desired manner.

The different components shown in FIG. 1 and FIGS. 3-11 may be combined with components in FIG. 2, used with components in FIG. 2, or a combination of the two. Additionally, some of the components in FIG. 1 and FIGS. 3-11 may be illustrative examples of how components shown in block form in FIG. 2 may be implemented as physical structures. Other configurations for spacer system 300 may be implemented other than those shown in FIGS. 3-11.

Figure 12:
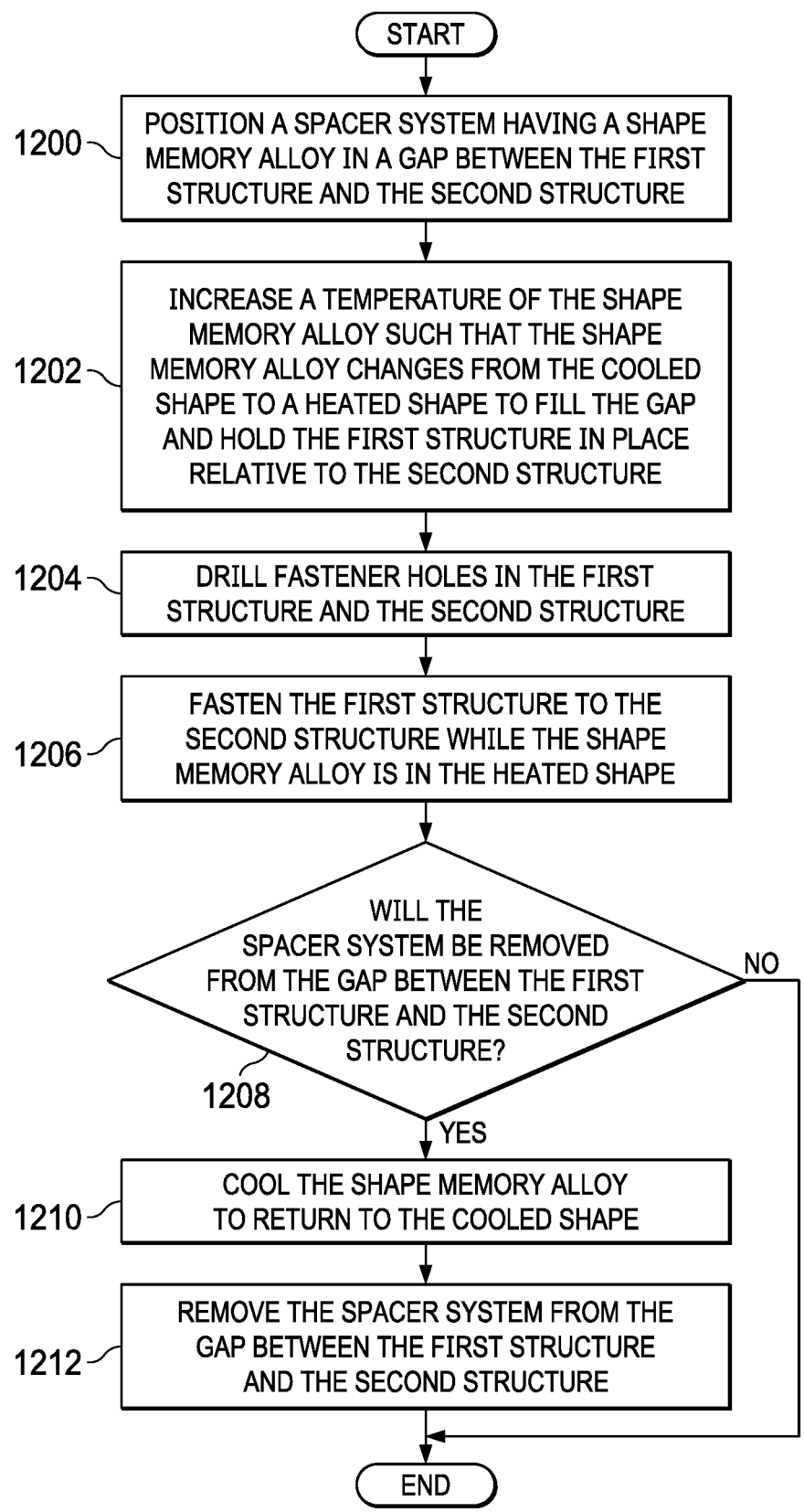
FIG. 12 is an illustration of a flowchart of a process for assembling an aircraft using a shape memory alloy spacer system in accordance with an illustrative embodiment.

With reference next to FIG. 12, an illustration of a flowchart of a process for assembling an aircraft using a shape memory alloy spacer system is depicted in accordance with an illustrative embodiment. The method depicted in FIG. 12 may be used with spacer system 202 to aid in joining two structures in aircraft 206 shown in FIG. 2.

The process begins by positioning a spacer system having a shape memory alloy in a gap between the first structure and the second structure (operation 1200). A temperature of the shape memory alloy is increased such that the shape memory alloy changes from the cooled shape to a heated shape to fill the gap and hold the first structure in place relative to the second structure (operation 1202).

Next, fastener holes are drilled in the first structure and the second structure (operation 1204). Holes may be drilled through the first structure, the second structure, and the spacer system.

The first structure is then fastened to the second structure while the shape memory alloy is in the heated shape (operation 1206). A determination is made as to whether the spacer system will be removed from the gap between the first structure and the second structure (operation 1208).

If the spacer system will be removed, the shape memory alloy is cooled to return to the cooled shape (operation 1210). The spacer system is then removed from the gap between the first structure and the second structure (operation 1212) with the process terminating thereafter. If the spacer system will not be removed, the process terminates.

Figure 13:
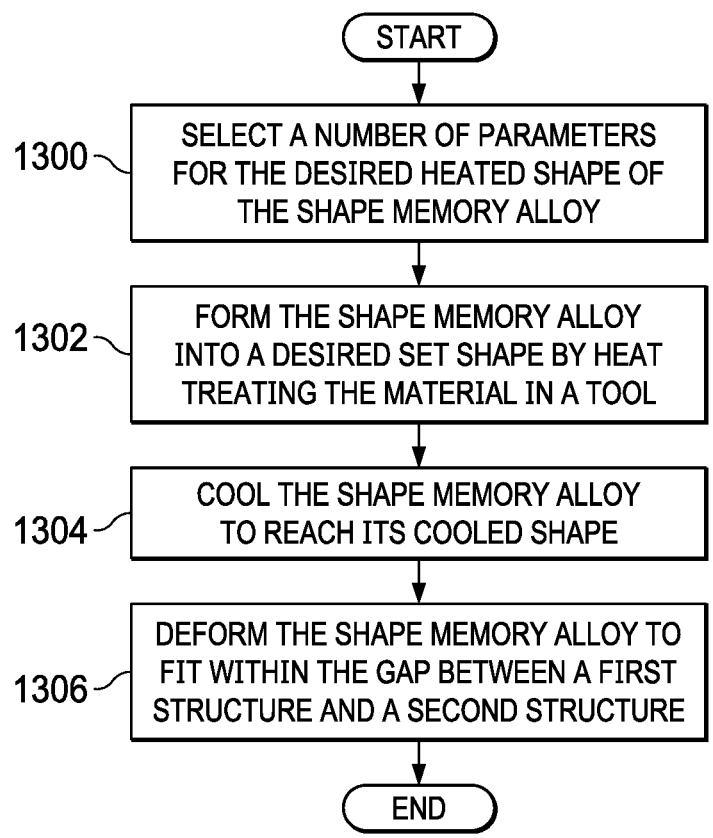
FIG. 13 is an illustration of a flowchart of a process for forming a shape memory alloy spacer system in accordance with an illustrative embodiment.

Turning now to FIG. 13, an illustration of a flowchart of a process for forming a shape memory alloy spacer system is depicted in accordance with an illustrative embodiment. The method described in FIG. 13 may be used to form spacer system 202 from FIG. 2.

The process begins by selecting a number of parameters for the desired heated shape of the shape memory alloy (operation 1300). Next, the process forms the shape memory alloy into a desired set shape by heat treating the material in a tool (operation 1302). The tool may be a form or fixture. The set shape corresponds to the desired expanded shape.

The process then cools the shape memory alloy to reach its cooled shape (operation 1304). The shape memory alloy is then deformed to fit within the gap between a first structure and a second structure (operation 1306) with the process terminating thereafter. Deformation may be achieved by pressing or tensile pulling. The shape memory alloy may be deformed until it is substantially flat. After completion of the process described in FIG. 13, the shape memory alloy spacer system is ready for use as described in FIG. 12.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 14:
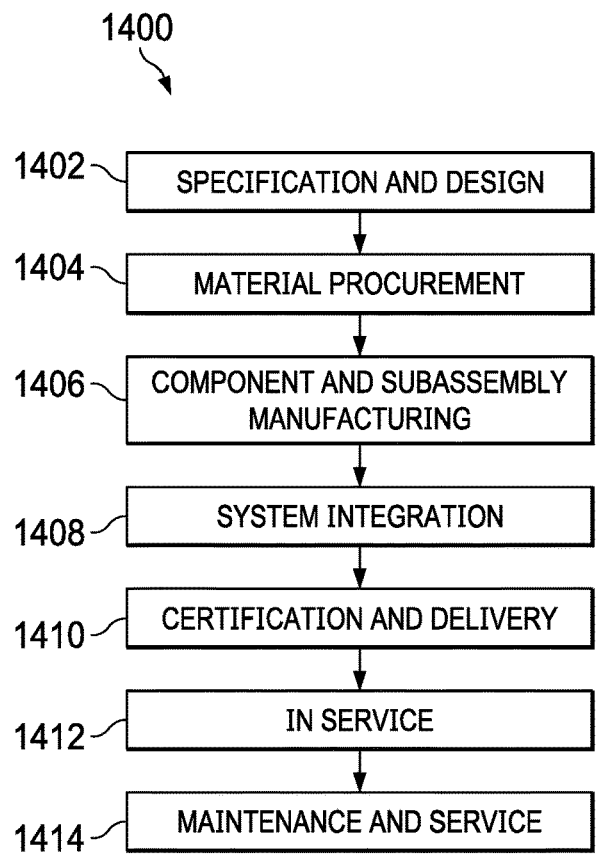
FIG. 14 is an illustration of a block diagram of an aircraft manufacturing and service method in accordance with an illustrative embodiment.
Figure 15:
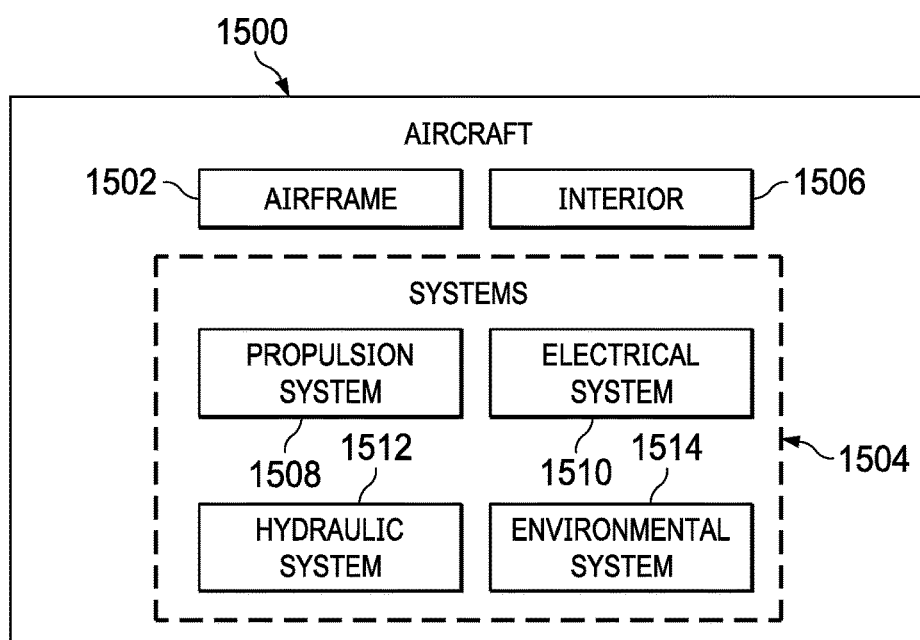
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Spacer system 202 from FIG. 2 may be made during component and subassembly manufacturing 1406. In addition, spacer system 202 may be used to modify parts made for routine maintenance and service 1414 as part of a modification, reconfiguration, or refurbishment of aircraft 1500 in FIG. 15.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 15, an illustration of a block diagram of an aircraft is depicted in which a composite structure made using an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

With the use of an illustrative embodiment, assembly of components for aircraft applications takes less time and costs less than with currently used systems. A single shape memory alloy design can be tailored to fill a range of gap sizes, replacing the many shim sizes that currently need to be custom manufactured. The expanded/heated shape for the spacer system may be selected to provide improved loading support in critical locations to maintain part dimensions during and after fastener installation. Shape memory alloys can easily fill non-uniform gaps to provide a desired level of support. Shape memory alloy spacers promote shimming consistency and repeatability while reducing the risk of deformation of one or both joined parts. Thus, an illustrative embodiment substantially reduces the trial and error approach to shim sizing and installation, saving time and money.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for aligning a first structure relative to a second structure, the method comprising:
positioning a spacer system in a gap between a surface of the first structure facing a surface of the second structure, wherein the spacer system comprises a shape memory alloy in a cooled shape; and
increasing a temperature of the shape memory alloy and changing the shape memory alloy from the cooled shape to a heated shape to fill the gap and apply a first load against the surface of the first structure and a second load against the surface of the second structure and holding the first structure in place relative to the second structure.

2. The method of claim 1, further comprising fastening the first structure to the second structure while the shape memory alloy is in the heated shape.

3. The method of claim 1, further comprising:
cooling the shape memory alloy such that the shape memory alloy returns to the cooled shape; and
removing the spacer system from the gap between the first structure and the second structure.

4. The method of claim 1, further comprising:
forming the shape memory alloy into a desired heated shape for its heated state; and
cooling the shape memory alloy to reach the cooled shape.

5. The method of claim 4, further comprising deforming the cooled shape to fit within the gap between the first structure and the second structure.

6. The method of claim 1, wherein the first structure and the second structure are part of a platform and the spacer system with the shape memory alloy remains in the platform for a life of the platform.

7. An apparatus that comprises:
a spacer system that comprises a shape memory alloy configured to:
form a heated shape when heated, such that the spacer system fills a gap between a surface of a first structure that faces a surface of a second structure and applies a first load against the surface of the first structure and a second load against the surface of the second structure; and
hold the first structure in place relative to the second structure.

8. The apparatus of claim 7, further comprising a base configured to retract the spacer system as the shape memory alloy returns to a cooled shape.

9. The apparatus of claim 7, wherein the spacer system comprises:
a plurality of segments each comprising the shape memory alloy.

10. The apparatus of claim 7, wherein the shape memory alloy is configured to remain in the heated shape and apply the first load to the surface of the first structure and the second load to the surface of the second structure when returned to a cooled state.

11. The apparatus of claim 10, wherein the shape memory alloy is configured to return to a cooled shape when in the cooled state.

12. The apparatus of claim 7, further comprising the heated shape for the spacer system configured based upon a number of parameters selected from at least one of: sheet thickness, two-dimensional geometric feature shape, three-dimensional geometric feature shape, geometric feature height, geometric feature spacing, and a material.

13. A method for assembling an aircraft, the method comprising:
positioning a spacer system comprising a shape memory alloy in a cooled shape into a gap between a surface of a first structure facing a surface of a second structure in the aircraft; and
increasing a temperature of the shape memory alloy and changing the shape memory alloy from the cooled shape to a heated shape and filling the gap and applying a first load against the surface of the first structure and a second load against the surface of the second structure to hold the first structure in place relative to the second structure.

14. The method of claim 13 further comprising:
fastening the first structure to the second structure while the shape memory alloy is in the heated shape.

15. The method of claim 13 further comprising:
cooling the shape memory alloy such that the shape memory alloy returns to a cooled state, wherein the shape memory alloy comprises the cooled shape in the cooled state; and
removing the spacer system from the gap between the first structure and the second structure.

16. The method of claim 13 further comprising:
forming the shape memory alloy into a desired heated shape for its heated state.

17. The method of claim 16 further comprising:
deforming the shape memory alloy to fit within the gap between the first structure and the second structure.

18. The method of claim 16 further comprising:
forming the shape memory alloy such that once heated, the shape memory alloy does not contract when cooled.

19. The method of claim 16 further comprising:
forming the shape memory alloy for removal from the gap between the first structure and the second structure via contracting the shape memory alloy via cooling after heating.

20. The method of claim 16, further comprising selecting a number of parameters for the heated shape of the shape memory alloy, wherein the number of parameters is selected from at least one of: sheet thickness, two-dimensional geometric feature shape, three-dimensional geometric feature shape, geometric feature height, geometric feature spacing, and a material.

* * * * *